April 13, 1937. J. POMBO 2,076,667

REENFORCED FLEXIBLE ELECTRIC CABLE

Filed Feb. 12, 1935

INVENTOR.
James Pombo
BY Ramsey & Kent
his ATTORNEYS.

Patented Apr. 13, 1937

2,076,667

UNITED STATES PATENT OFFICE 2,076,667

REENFORCED FLEXIBLE ELECTRIC CABLE

James Pombo, East Providence, R. I., assignor to American Insulated Wire Corp., Providence, R. I., a corporation of Rhode Island Application February 12, 1935, Serial No. 6,165

9 Claims. (Cl. 173—264)

This invention relates to improvements in flexible electric cables or cords and more particularly to improvements in reenforced cables or cords of this character.

An object of the present invention is to provide a covered electric cable or cord of such character that the cable or cord can withstand an increased number of flexings.

Another object of the invention is to provide for a covered electric cable or cord reenforcing means for extending the life thereof.

A further object of the invention is to provide in a flexible electric cable or cord a plurality of reenforcing means extending longitudinally thereof.

An additional object of the invention is to provide in a flexible electric cable or cord a plurality of reenforcing means secured to the cable or cord by a covering interlocked with the covering of the cable or cord proper.

In accordance with the invention, the electric cable or cord contemplated comprises in the preferred form a plurality of insulated wires surrounded by additional electric and thermal insulating material, all surrounded by a flexible covering. In addition to this flexible covering provision is made for reenforcing the cable, such reenforcement comprising a plurality of flexible strands of material secured to the exterior of the cable cover and extending longitudinally thereof. Preferably, these reenforcing members are covered with material similar to the material of the covering of the cable, and in order that the reenforcing members may be locked to the cable, the cover of the reenforcing members is interlaced or otherwise interlocked to the covering of the cable.

In one form of the invention, the two conductor wires are surrounded by electric and thermal insulating material and enclosed in a flexible fabric covering. In order that this cable including the covering may have a longer life, reenforcing members in the nature of strands of rubber are applied to the covering to extend longitudinally thereof. These reenforcing members are covered by means of fabric which is interlocked with the covering of the cable so that the reenforcing members are effectively locked to the assembly.

Other features, objects and advantages of the invention will become apparent by reference to the following detailed description taken in conjunction with the accompanying drawing forming a part of the same, wherein Fig. 1 is a plan view, partially fragmentary of the elements combined to form the invention;

Figure 1:
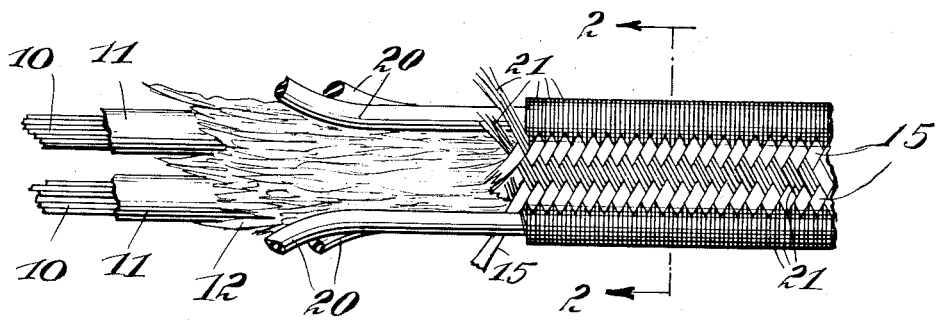
Figure 2:
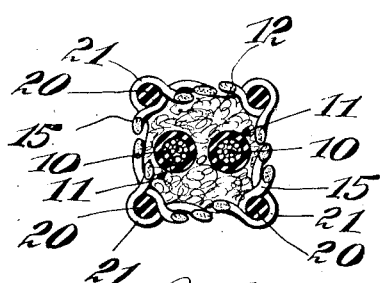
Fig. 2 is a section taken substantially on the line 2—2 of Fig. 1.

Referring now to the drawing and particularly to Figs. 1 and 2, 10 indicates the two electric conductors, which, in the present instance, are illustrated as being made up of a plurality of metallic strands. It will be understood, of course, that a single wire conductor may be substituted for the multi-strand wires as is well-known in the art. These strands 10 are covered by insulating material 11, such as, rubber, in the customary fashion. Surrounding the two strands in their insulated covers is a mass of electric and thermal insulating material 12, such as asbestos wool or fibers. The assembly of insulated conductors and insulating material 12 is covered by flexible covering made up of a plurality of strands 15 of some suitable fabric, such as, silk, rayon, cotton, etc. These strands are woven around the assembly in the customary fashion.

In order that the cable or cord made up of the assembly covered in the manner just described may be reenforced to withstand increased flexing, use is made of a plurality of flexible ribs 20 extending longitudinally of the cable and positioned on top of the strands 15 comprising the base cover of the cable. These ribs 20 are held in place by strands 21 of fabric similar to the strands 15. The strands 21 are interwoven with the strands 15 as illustrated to strengthen the covering of the entire cable and at the same time to lock the ribs to the cable. The ribs 20 in the preferred form comprise round strips of flexible rubber, but it is to be understood that any suitable material in any desired shape may be used, such as, flexible fiber, flexible metal, etc. In the embodiment of the invention shown in Figs. 1 and 2, four reenforcing ribs are utilized.

Figure 4:
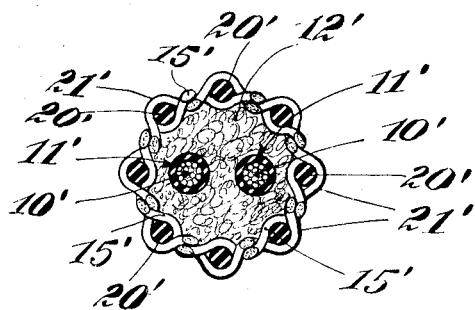
Fig. 4 is a section taken substantially on the line 4—4 of Fig. 3.
Figure 3:
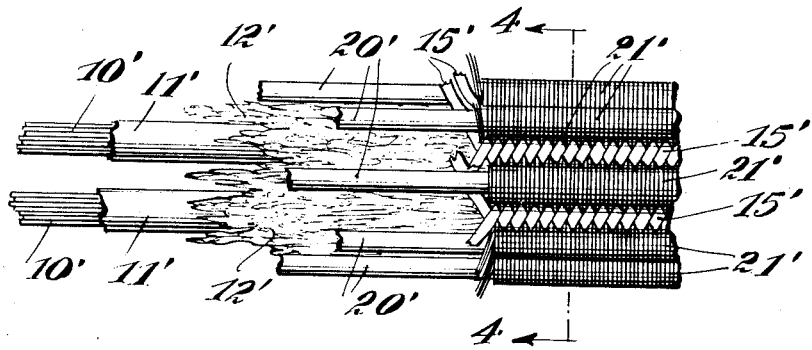
Fig. 3 is a view similar to Fig. 1 of a conductor having an increased number of reenforcing members.

In the embodiment of the invention shown in Figs. 3 and 4, the construction is similar to that previously described with the exception that the number of reenforcing ribs 20' is increased to eight. In this form of the invention the assembly of insulated conductors indicated at 10' and 11' and insulating material 12' is covered by strands 15' of material similar to the material of the strands 15. The reenforcing ribs 20' in turn are covered by strands 21' similar to the strands 21.

As the result of the construction shown in the drawing, regardless of the embodiment thereof, it will be apparent that the resultant cable or cord is a reenforced cable or cord which can withstand an increased number of flexings, and which consequently possesses considerably longer life than is present in cables or cords not so reenforced. In actual practice it has been found that the cable or cord having four reenforcing ribs secured thereto is able to withstand approximately double the number of flexings of a cable or cord not so reenforced. The particular arrangement of the attaching means for the ribs adds to the longevity of the cable or cord inasmuch as the ribs or reenforcing members are actually positioned on top of the fabric enclosing the assembly being held in place by fabric strands as described, so that even though the fabric covering the reenforcing ribs be worn away the base fabrics are not disturbed so that the electric and thermal insulating material will not be exposed to become separated from the assembly. It will be apparent, of course, that the longevity of the cable or cord is increased in proportion to the number of reenforcing ribs utilized, and it is to be understood that these ribs may be applied in any number desired. The embodiments illustrated are for purposes merely of showing two forms of the invention.

While in the drawing the reenforcing ribs have been illustrated as being applied to the cable or cord in such fashion as to extend longitudinally thereof in substantial parallelism to the axis of the cable or cord, it is apparent that these reenforcing ribs need not necessarily extend in this fashion, but if desired may be secured to the cable or cord in the manner illustrated in such fashion as to extend longitudinally thereof in spiral fashion, or in any other desired fashion. Furthermore, while the invention has been illustrated and described in connection with a fabric covered cable or cord, it is to be understood that the invention contemplates the use of any type of covering so long as the covering is of a flexible nature, and so long as the actual covering of the reenforcing ribs can be secured to or interlocked to the base cover of the assembly in some suitable manner.

It will be apparent from the foregoing that cables or cords made in accordance with the present invention have ribbed or fluted exteriors, with the ribs extending substantially longitudinally of the cable or cord. These ribs serve not only to reenforce the cable to withstand an increased number of flexings, but they also serve as buffers to absorb any shocks to which the cable may be subjected. This buffer action is of particular importance in cable constructions wherein electric and thermal insulating material surrounds the insulated wires. Contact of the cover, which retains the insulating material in the assembly, with rough edges or sharp corners would ordinarily tend to rupture the covering, permitting escape of this insulating material. With the ribs in use, however, this covering, in immediate contact with the insulating material, is protected from such shocks or rubbings as would tend to rupture the same.

It is to be understood that the invention is not to be limited to the particular manner of securing the reenforcing members to the cable illustrated and described. These members can be secured to the cable assembly in any of several suitable manners, and, in fact, where the material of the covering permits, the reenforcing members may even be made integral therewith.

While the invention has been described herein in connection with fabric covered cables having separate reenforcing members secured thereto, it is to be understood that the invention is not to be limited to such showing, since, obviously, modification can be made without departing from the spirit thereof, in view of which any limitations imposed thereupon are to be such only as are set forth in the following claims.

I claim:

1. As a new article of manufacture, an electric cable or cord having a flexible covering made up of groups of fabric strands, spaced resilient reenforcing members overlying a selected group of said strands and extending substantially longitudinally of the cable, and another group of said strands covering said members and being interlocked to the strands of the first group between the respective members.

2. As a new article of manufacture, an electric cable or cord having a flexible covering, part of said covering being composed of fabric strands spirally wound in one direction, a plurality of reenforcing members positioned on the exterior of the strands so spirally wound, and another group of strands spirally wound in the opposite direction to the first group, said second group covering said reenforcing members and being interlocked to the first group between the respective members.

3. As a new article of manufacture, an electric cable or cord comprising insulated conductors, electric and thermal insulating material and a covering therefor, part of said covering being composed of fabric strands spirally wound in one direction, a plurality of flexible reenforcing members positioned on the exterior of the strands so spirally wound, and another group of strands spirally wound in the opposite direction to the first group, said second group covering said reenforcing members and being interlocked to the first group between the respective members.

4. As a new article of manufacture, an electric cable or cord comprising insulated conductors, a group of a plurality of flexible fabric strands forming a cover surrounding said conductors, a plurality of reenforcing members overlying said cover and extending substantially longitudinally thereof, and a second and distinct group of a plurality of flexible fabric strands forming a cover for said reenforcing members, said second group being locked to said first group to secure said reenforcing members to said first mentioned cover.

5. As a new article of manufacture, an electric cable or cord comprising insulated conductors, a plurality of flexible fabric strands spirally wrapped therearound in one direction to form a cover therefor, a plurality of reenforcing members overlying said cover and extending substantially longitudinally thereof, and a plurality of flexible fabric strands overlying said reenforcing members to form a cover therefor, said last mentioned strands extending spirally in the opposite direction to said first mentioned strands and being secured thereto between said reenforcing members.

6. As a new article of manufacture, an electric cable or cord comprising insulated conductors, a cover therefor made up of a plurality of groups of flexible fabric strands braided together in such fashion that one group of said strands extends spirally in one direction and another group of said strands extends spirally in the opposite direction, and a plurality of reenforcing members interposed between the respective groups of strands whereby one of said groups of strands underlies said reenforcing members and the other of said groups of strands overlies said reenforcing members.

7. As a new article of manufacture, an electric cable or cord comprising electric conductors and a cover therefor made up of pliable woven fabric, having a plurality of substantially longitudinal sleeves incorporated therein and a plurality of reenforcing members extending substantially longitudinally and positioned in said sleeves, said members being made of a different material which is pliable and elastic and has more resiliency than the material of said covering, said reenforcing members forming raised ribs on the surface of said covering.

8. As a new article of manufacture, an electric cable or cord comprising electric conductors, a covering therefor made up of pliable woven fabric, having a plurality of substantially longitudinal sleeves incorporated therein and a plurality of reenforcing members extending substantially longitudinally and positioned in said sleeves, said members being made of a different pliable material having more resiliency than the material of said covering, said covering being woven in locking relation so that said sleeves can be ruptured to bare said members without rupturing the remainder of said covering.

9. As a new article of manufacture, an electric cable or cord comprising electric conductors, thermal insulating material surrounding said conductors, a covering therefor made up of pliable braided fabric having a plurality of substantially longitudinal sleeves incorporated therein, and a plurality of reenforcing members extending substantially longitudinally and positioned in said sleeves, said members being made of a different pliable material having more resiliency than the material of said covering, said covering being woven in locking relation so that said sleeves can be ruptured to bare said members without so rupturing the remainder of said covering as to bare said thermal insulating material.

JAMES POMBO.